United States Patent
Wada

(10) Patent No.: US 9,528,899 B2
(45) Date of Patent: *Dec. 27, 2016

(54) TIRE PRESSURE DECREASE DETECTION APPARATUS AND METHOD, AND COMPUTER READABLE MEDIUM THEREFOR

(71) Applicant: SUMITOMO RUBBER INDUSTRIES, LTD., Kobe-shi, Hyogo (JP)

(72) Inventor: Mitsuhiro Wada, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/825,077

(22) Filed: Aug. 12, 2015

(65) Prior Publication Data

US 2015/0346047 A1 Dec. 3, 2015

Related U.S. Application Data

(62) Division of application No. 13/846,429, filed on Mar. 18, 2013, now Pat. No. 9,134,194.

(30) Foreign Application Priority Data

Aug. 24, 2012 (JP) ................. 2012-184902

(51) Int. Cl.
*B60C 23/04* (2006.01)
*B60C 23/06* (2006.01)
*G01L 27/00* (2006.01)

(52) U.S. Cl.
CPC ......... *G01L 27/005* (2013.01); *B60C 23/0427* (2013.01); *B60C 23/061* (2013.01); *B60C 23/062* (2013.01); *G01L 27/00* (2013.01)

(58) Field of Classification Search
CPC ... B60C 23/061; B60C 23/062; B60C 23/0408
(Continued)

(56) References Cited

U.S. PATENT DOCUMENTS 5,407,259 A 4/1995 Itabashi et al.
8,279,056 B2 10/2012 Fujita et al.
(Continued)

FOREIGN PATENT DOCUMENTS

JP 2010-023546 A 2/2010
JP 2010-023673 A 2/2010

*Primary Examiner* — Eric S McCall
*Assistant Examiner* — Anthony W Megna Fuentes
(74) *Attorney, Agent, or Firm* — Birch, Stewart, Kolasch & Birch, LLP

(57) ABSTRACT

A tire pressure decrease detection apparatus comprising: rotation speed information detection means, rotation acceleration information calculation means, resonance frequency estimate means for time-series estimating a torsional resonance frequency of the rotation speed information, correlation calculation means for, regarding front and rear right wheels and front and rear left wheels, respectively calculating time series correlations of the rotation acceleration information, and judgment means for judging a decrease in pressure of the tires based on the estimated torsional resonance frequency. In a case where the correlations exceed predetermined threshold values, the resonance frequency estimate means takes that a periodic noise from a road surface is generated in the vicinity of the torsional resonance frequency and stops estimating the torsional resonance frequency of the front and rear wheels of the side exceeding the threshold value.

5 Claims, 14 Drawing Sheets

1: WHEEL SPEED DETECTION MEANS
2: CONTROL UNIT
3: DISPLAY
4: INITIALIZATION BUTTON
5: ALARM

(58) Field of Classification Search
USPC .................. 73/146.2–146.5; 340/442–444
See application file for complete search history.

(56) References Cited

U.S. PATENT DOCUMENTS

| 8,299,909 B2 | 10/2012 | Fujita et al. |
| 2014/0046602 A1* | 2/2014 | Wada .................. B60C 23/00 702/43 |

* cited by examiner

1: WHEEL SPEED DETECTION MEANS
2: CONTROL UNIT
3: DISPLAY
4: INITIALIZATION BUTTON
5: ALARM

TIRE PRESSURE DECREASE DETECTION APPARATUS AND METHOD, AND COMPUTER READABLE MEDIUM THEREFOR

CROSS-REFERENCE TO RELATED APPLICATIONS

This application is a Divisional of copending application Ser. No. 13/846,429, filed on Mar. 18, 2013, which claims priority under 35 U.S.C. §119(a) to Application No. 2012-184902, filed in Japan on Aug. 24, 2012, all of which are hereby expressly incorporated by reference into the present application.

TECHNICAL FIELD

The present invention relates to a tire pressure decrease detection apparatus and method, and computer readable medium therefor. Further in detail, the present invention relates to a tire pressure decrease detection apparatus and method, and computer readable medium therefor for detecting a decrease in pressure of tires based on a torsional resonance frequency of the tires of a traveling vehicle.

BACKGROUND ART

One of factors for letting an automobile safely travel includes pressure of a tire. When the pressure is decreased to less than a proper value, operating stability and fuel consumption are deteriorated, so that a tire burst may sometimes be caused. Therefore, a tire pressure monitoring system (TPMS) for detecting a decrease in tire pressure and issuing an alarm so as to urge a driver to take a proper action is an important technique from a view of protecting an environment and ensuring safety of the driver.

The conventional monitoring system can be classified into two types including a direct detection type and an indirect detection type. The direct detection type is to directly measure the pressure of the tire by incorporating pressure sensors inside a tire wheel. Although the decrease in the pressure can be detected with high precision, some disadvantages in terms of technique and cost remain including a need for a dedicated wheel and a problem in fault tolerance in an actual environment.

Meanwhile, the indirect detection type is a method for estimating the pressure from rotation information of the tire, and can further be classified into a DLR (Dynamic Loaded Radius) method and a RFM (Resonance Frequency Mechanism) method. Among them, the RFM method can solve problems in the DLR method (problems such as incapability of detecting four-tire simultaneous deflation because relative comparison of rotation speed of wheels is the basic principle), and various techniques are proposed (for example, refer to Patent Literatures 1 and 2).

The RFM method in the inventions described in Patent Literatures 1 and 2 and the like utilizes a characteristic that a torsional resonance frequency of the tire is lowered by the deflation and time-series estimates the torsional resonance frequency of the tire from rotation speed information or rotation acceleration information of the tire so as to detect the decrease in the pressure of the tire.

CITATION LIST

Patent Literature

Patent Literature 1: Japanese Unexamined Patent Publication No. 2010-023546

Patent Literature 2: Japanese Unexamined Patent Publication No. 2010-023673

SUMMARY OF INVENTION

Technical Problem

However, in a case where the vehicle travels on a road surface which is periodically continuously undulated, there is sometimes a case where a periodic noise is generated in the vicinity of the torsional resonance frequency of the tire according to vehicle speed at the time. In this case, the resonance frequency time-series estimated by an AR model or the like is pulled by such a periodic noise and hence becomes a different value from the original torsional resonance frequency of the tire. As a result, there is a fear that an erroneous alarm or non-alarm is caused in the TPMS.

The present invention has been made in view of the above circumstances, and an objective thereof is to provide a tire pressure decrease detection apparatus and method, and computer readable medium therefor capable of removing or suppressing an influence of a periodic noise from a road surface so as to eliminate an erroneous alarm or non-alarm of a decrease in tire pressure.

Solution to Problem (1) A tire pressure decrease detection apparatus (hereinafter, also simply referred to as the "detection apparatus") according to a first aspect of the present invention includes:

rotation speed information detection means for regularly detecting rotation speed information of tires of wheels of a vehicle, rotation acceleration information calculation means for calculating rotation acceleration information of the tires from the rotation speed information obtained by the rotation speed information detection means, resonance frequency estimate means for time-series estimating a torsional resonance frequency of the rotation speed information from the rotation speed information obtained by the rotation speed information detection means, correlation calculation means for, regarding front and rear right wheels and front and rear left wheels, respectively calculating time series correlations of the rotation acceleration information calculated by the rotation acceleration information calculation means, and judgment means for judging a decrease in pressure of the tires based on the estimated torsional resonance frequency, wherein in a case where the correlations calculated by the correlation calculation means exceed predetermined threshold values, the resonance frequency estimate means takes that a periodic noise from a road surface is generated in the vicinity of the torsional resonance frequency and stops estimating the torsional resonance frequency of the front and rear wheels of the side exceeding the threshold value.

In the detection apparatus of the present invention, in a case where the correlations calculated by the correlation calculation means exceed the predetermined threshold values, the resonance frequency estimate means takes that the periodic noise from the road surface is generated in the vicinity of the torsional resonance frequency and stops estimating the torsional resonance frequency of the front and rear wheels of the side exceeding the threshold value. Thus, an influence of the periodic noise from the road surface can be removed or suppressed so as to eliminate an erroneous alarm or non-alarm of the decrease in the tire pressure.

(2) A detection apparatus according to a second aspect of the present invention includes:

rotation speed information detection means for regularly detecting rotation speed information of tires of wheels of a vehicle, rotation acceleration information calculation means for calculating rotation acceleration information of the tires from the rotation speed information obtained by the rotation speed information detection means, resonance frequency estimate means for time-series estimating a torsional resonance frequency of the rotation speed information from the rotation speed information obtained by the rotation speed information detection means, correlation calculation means for, regarding front and rear wheels, respectively calculating wheel acceleration differences between left and right wheels based on the rotation acceleration information calculated by the rotation acceleration information calculation means, and calculating a time series correlation of the wheel acceleration differences of the front and rear wheels with using the calculated wheel acceleration differences between the left and right wheels, and judgment means for judging a decrease in pressure of the tires based on the estimated torsional resonance frequency, wherein in a case where the correlation calculated by the correlation calculation means exceeds a predetermined threshold value, the resonance frequency estimate means takes that a periodic noise from a road surface is generated in the vicinity of the torsional resonance frequency and stops estimating the torsional resonance frequency.

(3) A detection apparatus according to a third aspect of the present invention includes:

rotation speed information detection means for regularly detecting rotation speed information of tires of wheels of a vehicle, rotation acceleration information calculation means for calculating rotation acceleration information of the tires from the rotation speed information obtained by the rotation speed information detection means, resonance frequency estimate means for time-series estimating a torsional resonance frequency of the rotation acceleration information from the rotation acceleration information obtained by the rotation acceleration information detection means, correlation calculation means for, regarding front and rear right wheels and front and rear left wheels, respectively calculating time series correlations of the rotation acceleration information calculated by the rotation acceleration information calculation means, and judgment means for judging a decrease in pressure of the tires based on the estimated torsional resonance frequency, wherein in a case where the correlations calculated by the correlation calculation means exceed predetermined threshold values, the resonance frequency estimate means takes that a periodic noise from a road surface is generated in the vicinity of the torsional resonance frequency and stops estimating the torsional resonance frequency of the front and rear wheels of the side exceeding the threshold value.

(4) A detection apparatus according to a fourth aspect of the present invention includes:

rotation speed information detection means for regularly detecting rotation speed information of tires of wheels of a vehicle, rotation acceleration information calculation means for calculating rotation acceleration information of the tires from the rotation speed information obtained by the rotation speed information detection means, resonance frequency estimate means for time-series estimating a torsional resonance frequency of the rotation acceleration information from the rotation acceleration information obtained by the rotation acceleration information detection means, correlation calculation means for, regarding front and rear wheels, respectively calculating wheel acceleration differences between left and right wheels based on the rotation acceleration information calculated by the rotation acceleration information calculation means, and calculating a time series correlation of the wheel acceleration differences of the front and rear wheels with using the calculated wheel acceleration differences between the left and right wheels, and judgment means for judging a decrease in pressure of the tires based on the estimated torsional resonance frequency, wherein in a case where the correlation calculated by the correlation calculation means exceeds a predetermined threshold value, the resonance frequency estimate means takes that a periodic noise from a road surface is generated in the vicinity of the torsional resonance frequency and stops estimating the torsional resonance frequency.

(5) Preferably, the detection device of (1) to (4) described above further includes a band-pass filter for letting only a frequency bandwidth in the vicinity of the torsional resonance frequency pass, wherein the correlation calculation means calculates a time series correlation of the rotation acceleration information passing through the band-pass filter.

(6) A tire pressure decrease detection method (hereinafter, also simply referred to as the "detection method") according to a fifth aspect of the present invention includes:

a rotation speed information detection step for regularly detecting rotation speed information of tires of wheels of a vehicle, a rotation acceleration information calculation step for calculating rotation acceleration information of the tires from the rotation speed information obtained in the rotation speed information detection step, a resonance frequency estimate step for time-series estimating a torsional resonance frequency of the rotation speed information from the rotation speed information obtained in the rotation speed information detection step, a correlation calculation step for, regarding front and rear right wheels and front and rear left wheels, respectively calculating time series correlations of the rotation acceleration information calculated in the rotation acceleration information calculation step, and a judgment step for judging a decrease in pressure of the tires based on the estimated torsional resonance frequency, wherein in a case where the correlations calculated in the correlation calculation step exceed predetermined threshold values, the resonance frequency estimate step takes that a periodic noise from a road surface is generated in the vicinity of the torsional resonance frequency and stops estimating the torsional resonance frequency of the front and rear wheels of the side exceeding the threshold value.

In the detection method of the present invention, in a case where the correlations calculated in the correlation calculation step exceed the predetermined threshold values, the resonance frequency estimate step takes that the periodic noise from the road surface is generated in the vicinity of the torsional resonance frequency and stops estimating the torsional resonance frequency of the front and rear wheels of the side exceeding the threshold value. Thus, the influence of the periodic noise from the road surface can be removed or suppressed so as to eliminate the erroneous alarm or the non-alarm of the decrease in the tire pressure.

(7) A detection method according to a sixth aspect of the present invention includes:

a rotation speed information detection step for regularly detecting rotation speed information of tires of wheels of a vehicle, a rotation acceleration information calculation step for calculating rotation acceleration information of the tires from the rotation speed information obtained in the rotation speed information detection step, a resonance frequency estimate step for time-series estimating a torsional resonance frequency of the rotation speed information from the rotation speed information obtained in the rotation speed information detection step, a correlation calculation step for, regarding front and rear wheels, respectively calculating wheel acceleration differences between left and right wheels based on the rotation acceleration information calculated in the rotation acceleration information calculation step, and calculating a time series correlation of the wheel acceleration differences of the front and rear wheels with using the calculated wheel acceleration differences between the left and right wheels, and a judgment step for judging a decrease in pressure of the tires based on the estimated torsional resonance frequency, wherein in a case where the correlation calculated in the correlation calculation step exceeds a predetermined threshold value, the resonance frequency estimate step takes that a periodic noise from a road surface is generated in the vicinity of the torsional resonance frequency and stops estimating the torsional resonance frequency.

(8) A detection method according to a seventh aspect of the present invention includes:

a rotation speed information detection step for regularly detecting rotation speed information of tires of wheels of a vehicle, a rotation acceleration information calculation step for calculating rotation acceleration information of the tires from the rotation speed information obtained in the rotation speed information detection step, a resonance frequency estimate step for time-series estimating a torsional resonance frequency of the rotation acceleration information from the rotation acceleration information obtained in the rotation acceleration information calculation step, a correlation calculation step for, regarding front and rear right wheels and front and rear left wheels, respectively calculating time series correlations of the rotation acceleration information calculated in the rotation acceleration information calculation step, and a judgment step for judging a decrease in pressure of the tires based on the estimated torsional resonance frequency, wherein in a case where the correlations calculated in the correlation calculation step exceed predetermined threshold values, the resonance frequency estimate step takes that a periodic noise from a road surface is generated in the vicinity of the torsional resonance frequency and stops estimating the torsional resonance frequency of the front and rear wheels of the side exceeding the threshold value.

(9) A detection method according to an eighth aspect of the present invention includes:

a rotation speed information detection step for regularly detecting rotation speed information of tires of wheels of a vehicle, a rotation acceleration information calculation step for calculating rotation acceleration information of the tires from the rotation speed information obtained in the rotation speed information detection step, a resonance frequency estimate step for time-series estimating a torsional resonance frequency of the rotation acceleration information from the rotation acceleration information obtained in the rotation acceleration information calculation step, a correlation calculation step for, regarding front and rear wheels, respectively calculating wheel acceleration differences between left and right wheels based on the rotation acceleration information calculated in the rotation acceleration information calculation step, and calculating a time series correlation of the wheel acceleration differences of the front and rear wheels with using the calculated wheel acceleration differences between the left and right wheels, and a judgment step for judging a decrease in pressure of the tires based on the estimated torsional resonance frequency, wherein in a case where the correlation calculated in the correlation calculation step exceeds a predetermined threshold value, the resonance frequency estimate step takes that a periodic noise from a road surface is generated in the vicinity of the torsional resonance frequency and stops estimating the torsional resonance frequency.

(10) Preferably, in the detection method of (6) to (9) described above, the correlation calculation step calculates a time series correlation of the rotation acceleration information passing through a band-pass filter for letting only a frequency bandwidth in the vicinity of the torsional resonance frequency pass.

(11) A non-transitory computer readable medium encoded with a computer program containing instructions stored therein according to a ninth aspect of the present invention causes a computer, for detecting a decrease in pressure of tires based on a resonance frequency of the tires of a traveling vehicle, to function as rotation acceleration information calculation means for calculating rotation acceleration information of the tires from rotation speed information obtained by rotation speed information detection means for regularly detecting the rotation speed information of the tires of wheels of the vehicle; resonance frequency estimate means for time-series estimating a torsional resonance frequency of the rotation speed information from the rotation speed information obtained by the rotation speed information detection means; correlation calculation means for, regarding front and rear right wheels and front and rear left wheels, respectively calculating time series correlations of the rotation acceleration information calculated by the rotation acceleration information calculation means; and judgment means for judging the decrease in the pressure of the tires based on the estimated torsional resonance frequency, wherein in a case where the correlations calculated by the correlation calculation means exceed predetermined threshold values, the resonance frequency estimate means takes that a periodic noise from a road surface is generated in the vicinity of the torsional resonance frequency and stops estimating the torsional resonance frequency of the front and rear wheels of the side exceeding the threshold value.

(12) A non-transitory computer readable medium encoded with a computer program containing instructions stored therein according to a tenth aspect of the present invention causes a computer, for detecting a decrease in pressure of tires based on a resonance frequency of the tires of a traveling vehicle, to function as rotation acceleration information calculation means for calculating rotation acceleration information of the tires from rotation speed information obtained by rotation speed information detection means for regularly detecting the rotation speed information of the tires of wheels of the vehicle; resonance frequency estimate means for time-series estimating a torsional resonance frequency of the rotation speed information from the rotation speed information obtained by the rotation speed information detection means; correlation calculation means for, regarding front and rear wheels, respectively calculating wheel acceleration differences between left and right wheels based on the rotation acceleration information calculated by the rotation acceleration information calculation means, and calculating a time series correlation of the wheel acceleration differences of the front and rear wheels with using the calculated wheel acceleration differences between the left and right wheels; and judgment means for judging the decrease in the pressure of the tires based on the estimated torsional resonance frequency, wherein in a case where the correlation calculated by the correlation calculation means exceeds a predetermined threshold value, the resonance frequency estimate means takes that a periodic noise from a road surface is generated in the vicinity of the torsional resonance frequency and stops estimating the torsional resonance frequency.

(13) A non-transitory computer readable medium encoded with a computer program containing instructions stored therein according to an eleventh aspect of the present invention causes a computer, for detecting a decrease in pressure of tires based on a resonance frequency of the tires of a traveling vehicle, to function as rotation acceleration information calculation means for calculating rotation acceleration information of the tires from rotation speed information obtained by rotation speed information detection means for regularly detecting the rotation speed information of the tires of wheels of the vehicle; resonance frequency estimate means for time-series estimating a torsional resonance frequency of the rotation acceleration information from the rotation acceleration information obtained by the rotation acceleration information detection means; correlation calculation means for, regarding front and rear right wheels and front and rear left wheels, respectively calculating time series correlations of the rotation acceleration information calculated by the rotation acceleration information calculation means; and judgment means for judging the decrease in the pressure of the tires based on the estimated torsional resonance frequency, wherein in a case where the correlations calculated by the correlation calculation means exceed predetermined threshold values, the resonance frequency estimate means takes that a periodic noise from a road surface is generated in the vicinity of the torsional resonance frequency and stops estimating the torsional resonance frequency of the front and rear wheels of the side exceeding the threshold value.

(14) A non-transitory computer readable medium encoded with a computer program containing instructions stored therein according to a twelfth aspect of the present invention causes a computer, for detecting a decrease in pressure of tires based on a resonance frequency of the tires of a traveling vehicle, to function as rotation acceleration information calculation means for calculating rotation acceleration information of the tires from rotation speed information obtained by rotation speed information detection means for regularly detecting the rotation speed information of the tires of wheels of the vehicle; resonance frequency estimate means for time-series estimating a torsional resonance frequency of the rotation acceleration information from the rotation acceleration information obtained by the rotation acceleration information detection means; correlation calculation means for, regarding front and rear wheels, respectively calculating wheel acceleration differences between left and right wheels based on the rotation acceleration information calculated by the rotation acceleration information calculation means, and calculating a time series correlation of the wheel acceleration differences of the front and rear wheels with using the calculated wheel acceleration differences between the left and right wheels; and judgment means for judging the decrease in the pressure of the tires based on the estimated torsional resonance frequency, wherein in a case where the correlation calculated by the correlation calculation means exceeds a predetermined threshold value, the resonance frequency estimate means takes that a periodic noise from a road surface is generated in the vicinity of the torsional resonance frequency and stops estimating the torsional resonance frequency.

Advantageous Effects of Invention

According to the detection apparatus and method, and computer readable medium therefor of the present invention, the influence of the periodic noise from the road surface can be removed or suppressed so as to eliminate the erroneous alarm or the non-alarm of the decrease in the tire pressure.

DESCRIPTION OF EMBODIMENTS

Hereinafter, with reference to the attached drawings, an embodiment of a tire pressure decrease detection apparatus and method, and computer readable medium therefor of the present invention will be described in detail.

Figure 1:
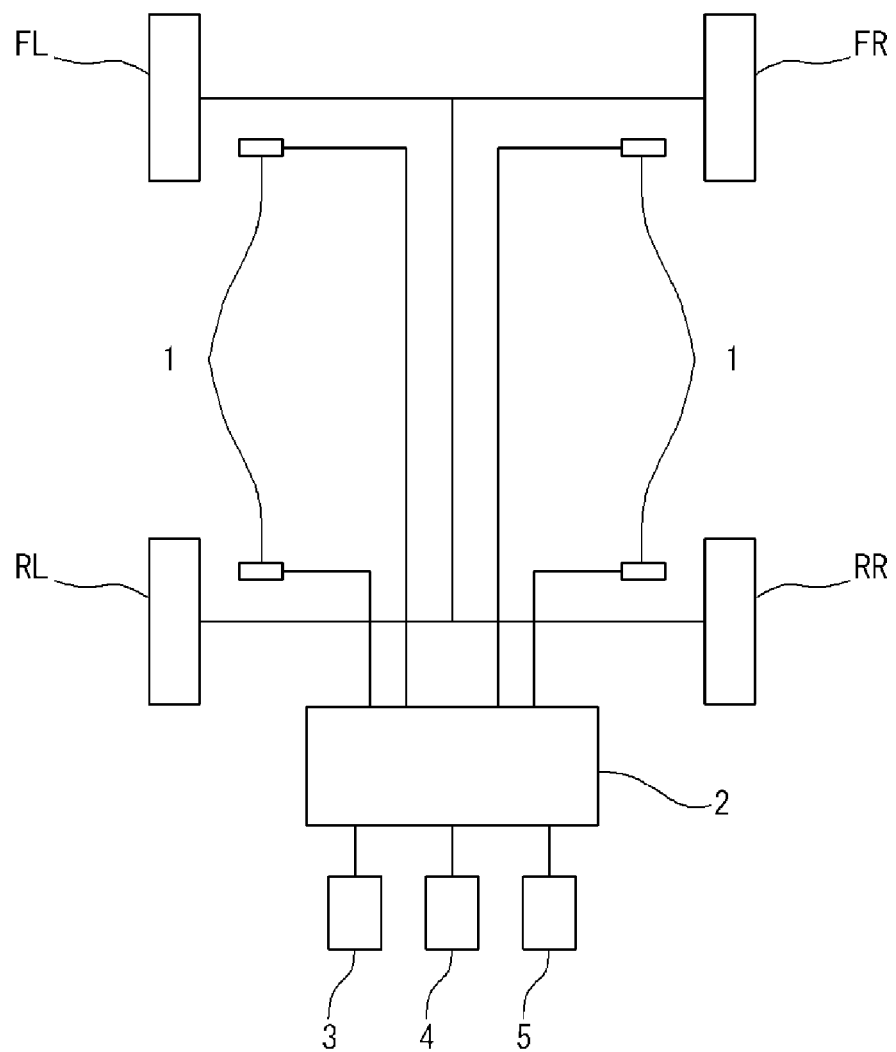
FIG. 1 is a block diagram showing one embodiment of a detection apparatus of the present invention.

As shown in FIG. 1, the detection apparatus according to one embodiment of the present invention is provided with normal wheel speed detection means (rotation speed information detection means) 1 provided in relation to tires in order to detect rotation speed information of a left front wheel (FL), a right front wheel (FR), a left rear wheel (RL), and a right rear wheel (RR) of four tires provided in a four-wheeled vehicle.

As the wheel speed detection means 1, there can be used a wheel speed sensor for generating a rotation pulse with using an electromagnetic pickup or the like so as to measure rotation angular velocity and wheel speed from the number of the pulse, an angular speed sensor including a sensor for generating electric power with utilizing rotation like a dynamo so as to measure the rotation angular velocity and the wheel speed from voltage thereof, or the like. An output of the wheel speed detection means 1 is given to a control unit 2 serving as a computer such as an ABS. Connected to the control unit 2 are a display 3 formed by a liquid crystal display element, a plasma display element, a CRT, or the like for displaying under-inflation of the tires for example, an initialization button 4 capable of being operated by a driver, and an alarm 5 for notifying the driver of the under-inflation of the tires.

Figure 2:
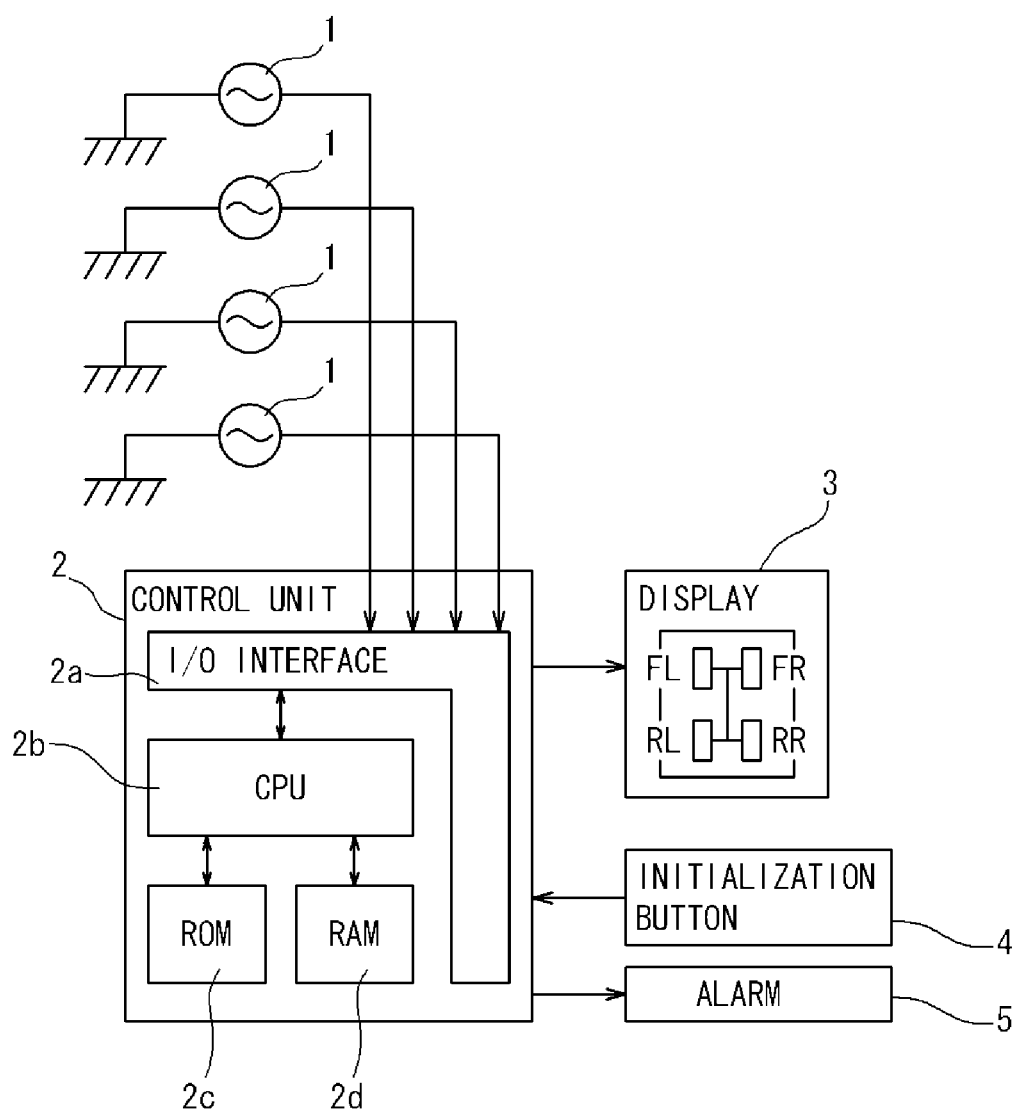
FIG. 2 is a block diagram showing an electric configuration of the detection apparatus shown in FIG. 1.

As shown in FIG. 2, the control unit 2 is formed by an I/O interface 2a required for sending and receiving signals to and from an external device, a CPU 2b functioning as a center of arithmetic processing, a ROM 2c in which a control operation program of the CPU 2b is stored, and a RAM 2d in which data and the like are temporarily written and the written data is read out when the CPU 2b performs control operation.

In the wheel speed detection means 1, a pulse signal corresponding to the rotation number of the tire (hereinafter, also referred to as the "wheel speed pulse") is outputted. By re-sampling the wheel speed pulse by a predetermined cycle $\Delta T$ (sec) such as $\Delta T=0.005$ seconds, time series data of wheel speed signals can be obtained. Since a resonance frequency in the torsional direction of the focused tire appears in the vicinity of tens of Hz, there is a need for setting a sampling cycle in such a manner that the resonance frequency is included in the Nyquist frequency.

The detection apparatus according to the present embodiment mainly includes the wheel speed detection means (rotation speed information detection means) 1, rotation acceleration information calculation means for calculating rotation acceleration information of the tires from the rotation speed information obtained by the wheel speed detection means 1, resonance frequency estimate means for time-series estimating a torsional resonance frequency of the rotation acceleration information from the rotation acceleration information obtained by the rotation acceleration information detection means, correlation calculation means for, regarding front and rear right wheels and front and rear left wheels, respectively calculating time series correlations of the rotation acceleration information calculated by the rotation acceleration information calculation means, and judgment means for judging a decrease in pressure of the tires based on the estimated torsional resonance frequency. In a case where the correlations calculated by the correlation calculation means exceed predetermined threshold values, the resonance frequency estimate means takes that a periodic noise from a road surface is generated in the vicinity of the torsional resonance frequency and stops estimating the torsional resonance frequency of the front and rear wheels of the side exceeding the threshold value. The computer program according to the present embodiment is installed in the control unit 2 and causes the control unit 2 to function as the rotation acceleration information calculation means, the resonance frequency estimate means, the correlation calculation means, and the judgment means.

The torsional resonance frequency can be estimated by performing a time series analysis for example to the rotation acceleration information based on the secondary autoregressive (AR) model. When the obtained torsional resonance frequency exceeds the predetermined threshold value to be less than the torsional resonance frequency calculated at the time of initialization, it is judged that the tire is under-inflated and the alarm 5 issues an alarm.

In the present invention, at the time of judging the decrease in the tire pressure focusing on a change in the torsional resonance frequency, in consideration with the fact that the periodic noise is generated in the vicinity of the torsional resonance frequency of the tires due to periodic undulation of the road surface on which the vehicle travels and there is a fear that an erroneous alarm or non-alarm is caused because of this, estimate of the torsional resonance frequency is stopped in a case where the periodic noise is generated.

In a case where the vehicle travels on a road surface which is randomly uneven or undulated, an input from the road surface is random. Thus, there should be no correlation of a frequency component between the road surfaces on which the front tire and the rear tire are grounded "now," that is, at a certain moment. However, in a case where the vehicle travels on a road surface which is periodically changed at equal intervals along the forward direction of the vehicle for example, there is a possibility that a correlation of the frequency component is generated between the road surfaces on which the front tire and the rear tire are grounded "now". When this frequency component appears in the frequency close to the original torsional resonance frequency, the time-series estimated value of the resonance frequency is pulled by the frequency component, so that the original torsional resonance frequency cannot be estimated, thus leading to the erroneous alarm or the non-alarm of the tire pressure decrease detection device.

Figure 3:
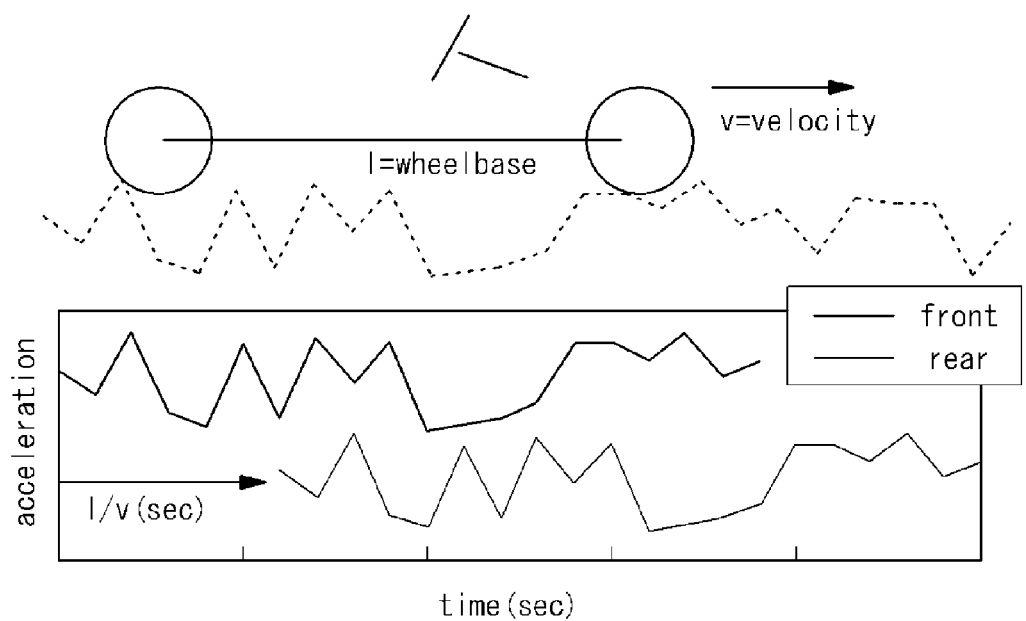
FIG. 3 is a chart showing one example of a time series change in wheel acceleration of a front tire and a rear tire in a case of traveling on a random road surface.
Figure 4:
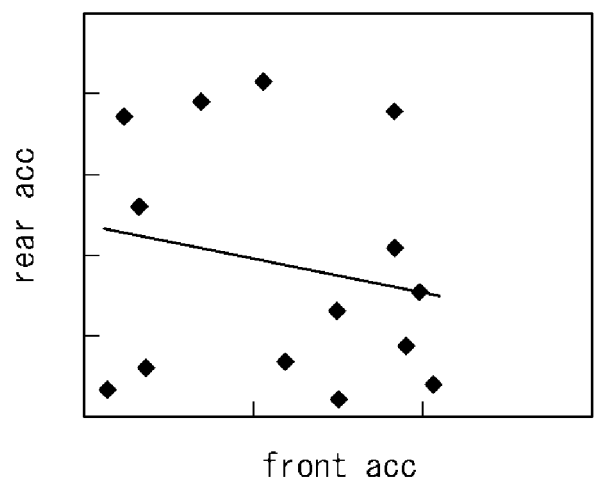
FIG. 4 is a chart showing a correlation of the wheel acceleration of the front tire and the wheel acceleration of the rear tire at the same time.

FIG. 3 is a chart showing one example of a time series change in wheel acceleration of the front tire and the rear tire in a case of traveling on the random road surface, and FIG. 4 is a chart showing a correlation of the wheel acceleration of the front tire (front acc) and the wheel acceleration of the rear tire (rear acc) at the same time. From FIGS. 3 to 4, it is found that in a case where the vehicle travels on the road surface which is randomly uneven or undulated, there is almost no correlation between the wheel acceleration of the front tire and the wheel acceleration of the rear tire. It should be noted that in FIG. 3 and FIG. 5 to be described later, "l/v (sec)" is a value obtained by dividing a wheelbase l (m) by vehicle speed v (m/s), showing a time from when the front wheel passes through a place to when the rear wheel passes through the same place.

Figure 5:
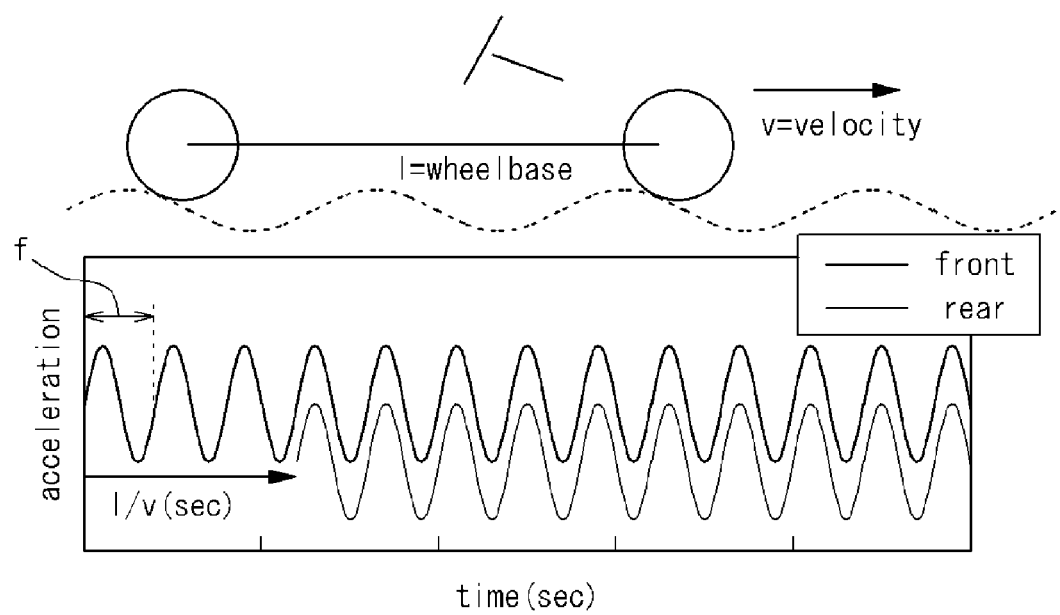
FIG. 5 is a chart showing one example of the time series change in the wheel acceleration of the front tire and the rear tire in a case of traveling on a road surface which is periodically undulated along the forward direction.
Figure 6:
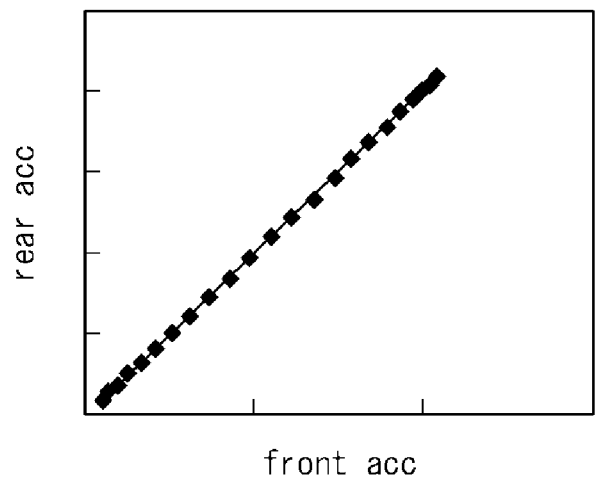
FIG. 6 is a chart showing a correlation of the wheel acceleration of the front tire and the wheel acceleration of the rear tire at the same time.

FIG. 5 is a chart showing one example of the time series change in the wheel acceleration of the front tire and the rear tire in a case of traveling on the road surface which is periodically undulated along the forward direction, and FIG. 6 is a chart showing a correlation of the wheel acceleration of the front tire and the wheel acceleration of the rear tire at the same time. In FIG. 5, "f" indicates one cycle of the periodically-changed wheel acceleration of the front tire. From FIGS. 5 to 6, it is found that in a case where the vehicle travels on the road surface which is periodically undulated along the forward direction, there is a possibility that a correlation is generated between the wheel acceleration of the front tire and the wheel acceleration of the rear tire according to the cycle of the undulation.

From the above description, by determining the correlation between the wheel acceleration of the front wheel and the wheel acceleration of the rear wheel, it can be judged whether or not the road surface is periodically undulated.

As a specific method for determining the correlation between the wheel acceleration of the front and rear wheels, for example, the following methods can be exemplified.

(A) A method for respectively calculating time series correlations of the rotation acceleration information calculated by the rotation acceleration information calculation means regarding the front and rear right wheels and the front and rear left wheels (correlation coefficients R or contributions $R^2$). In this case, the correlation calculated regarding the front and rear right wheels is compared with a predetermined threshold value preliminarily determined by experimental travel regarding the front and rear right wheels, and the correlation calculated regarding the front and rear left wheels is compared with a predetermined threshold value similarly preliminarily determined by experimental travel regarding the front and rear left wheels. The estimate of the torsional resonance frequency of the front and rear wheels of the side exceeding the threshold value is stopped. That is, in a case where the correlation calculated regarding the front and rear right wheels exceeds the predetermined threshold value, the estimate of the torsional resonance frequency regarding the front and rear right wheels is stopped. In a case where the correlation calculated regarding the front and rear left wheels exceeds the predetermined threshold value, the estimate of the torsional resonance frequency regarding the front and rear left wheels is also stopped.

(B) A method for respectively calculating wheel acceleration differences between the left and right wheels regarding the front and rear wheels, and calculating a time series correlation of the wheel acceleration differences of the front and rear wheels with using the calculated wheel acceleration differences between the left and right wheels. That is, the time series correlation of the wheel acceleration difference between the left and right front wheels and the wheel acceleration difference between the left and right rear wheels is calculated. In a case where the calculated correlation exceeds a predetermined threshold value, taking that the periodic noise from road surface is generated in the vicinity of the torsional resonance frequency, the estimate of the torsional resonance frequency is stopped regarding all the four wheels.

In the present embodiment, the correlation coefficients R or the contributions $R^2$ of the time of generation of the periodic noise from the road surface and of the time of non-generation are determined by an experiment in advance, and the threshold value is set in the middle. For example, when the correlation coefficient or the contribution of the wheel acceleration of the front and rear wheels calculated by the above method A or B becomes more than the threshold value, the time-series estimate of the torsional resonance frequency is stopped. That is, data of the wheel acceleration obtained when the correlation coefficient or the contribution becomes more than the threshold value is rejected. In a case where the contribution $R^2$ is adopted as the correlation, the threshold value can take a value within a range from 0.05 to 0.3 for example.

Regarding the number of the data for calculating the correlation, when the number of data is too small, precision is lowered, and when the number of the data is too large, the precision is improved but determination of estimate stop is delayed. Thus, the number is desirably about 100 (for 400 ms in a case of sampling by 4 ms) to 500 (for 2 s in a case of sampling by 4 ms). The correlation may be calculated by the iterative least squares method setting a forgetting factor of proper magnitude corresponding to the data number.

The closer the periodic noise from the road surface is to the torsional resonance frequency, the more an influence thereof is. Thus, in the tires in which the torsional resonance frequency is in a range from 30 to 50 Hz for example, desirably, a band-pass filter of 30 to 50 Hz is applied to the wheel acceleration of the left and right wheels and then the correlation coefficient or the contribution is calculated. Without the band-pass filter, even in a case where there is the periodic noise in a frequency bandwidth not exerting a harmful influence on the estimate of the torsional resonance frequency, the calculated value of the correlation coefficient is increased. Thus, although the resonance frequency can be accurately estimated, the estimate is stopped. However, when the band-pass filter is applied, the data in the frequency bandwidth not exerting a harmful influence on the estimate of the torsional resonance frequency is rejected, and the calculated value of the correlation coefficient is not increased. In this case, since the estimate of the resonance frequency is not stopped, an estimating opportunity is not wastefully reduced.

Figure 7:
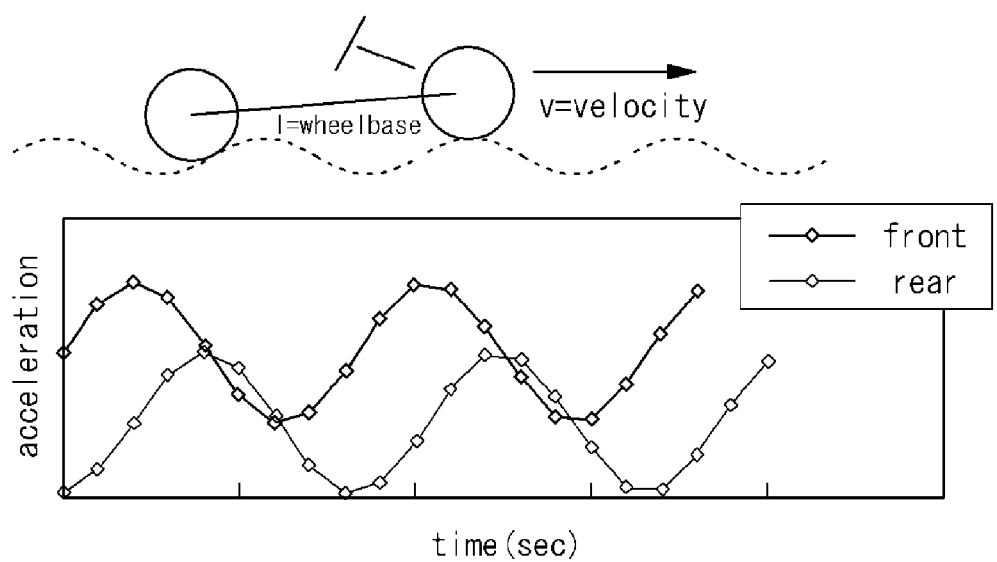
FIG. 7 is a chart showing another example of the time series change in the wheel acceleration of the front tire and the rear tire in a case of traveling on the road surface which is periodically undulated along the forward direction.
Figure 8:
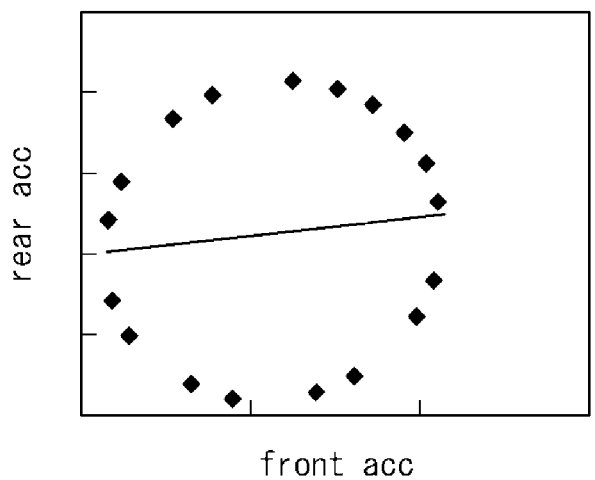
FIG. 8 is a chart showing a correlation of the wheel acceleration of the front tire and the wheel acceleration of the rear tire at the same time.

Even on the road surface which is periodically undulated along the forward direction of the vehicle, depending on the size of the wheelbase, there may be no correlation of the front and rear wheels as shown in FIGS. 7 to 8. FIG. 7 shows one example of the time series change in the wheel acceleration of the front tire and the rear tire in a case of traveling on the road surface which is periodically undulated along the forward direction as well as FIG. 5. However, when the front tire is on a top of a convex part and the rear tire is placed at a zero position (position where a phase is displaced by 90°), there is no correlation of the wheel acceleration of the front and rear wheels even on the road surface which is periodically undulated along the forward direction. FIG. 8 is a chart showing a correlation of the wheel acceleration of the front tire and the wheel acceleration of the rear tire at the same time.

Meanwhile, with not the correlation of the wheel acceleration of the front tire and the rear tire at the same time but a correlation of the current wheel acceleration of the rear tire and the past wheel acceleration of the front tire such as the wheel acceleration of the front tire of one or two cycles before, there is sometimes a correlation capable of judging that the road surface is periodically undulated along the forward direction.

Figure 9A:
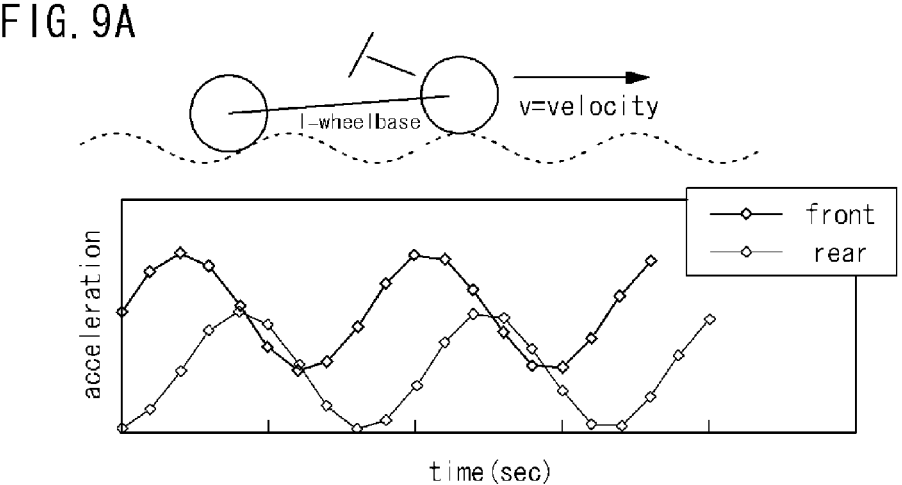
FIG. 9A is a chart showing one example of the time series change in the wheel acceleration of the front tire and the rear tire in a case of traveling on the road surface which is periodically undulated along the forward direction.
Figure 9B:
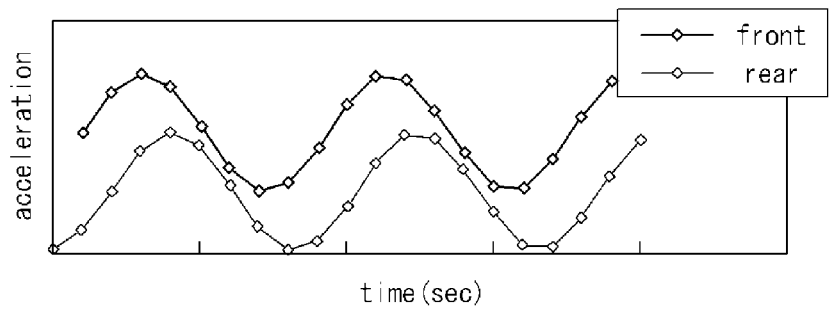
FIG. 9B is a chart showing one example of the time series change in the wheel acceleration of the front tire and the rear tire in a case of traveling on the road surface which is periodically undulated along the forward direction.
Figure 9C:
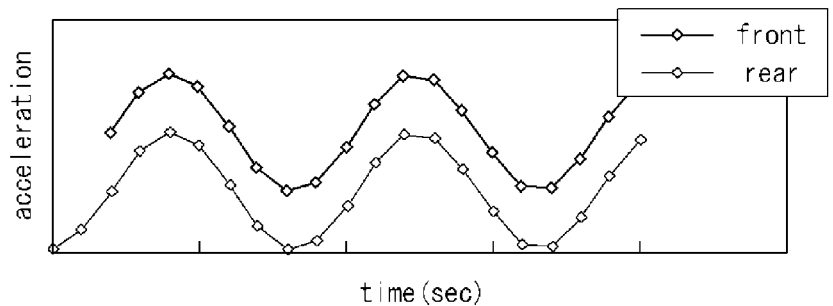
FIG. 9C is a chart showing one example of the time series change in the wheel acceleration of the front tire and the rear tire in a case of traveling on the road surface which is periodically undulated along the forward direction.
Figure 10A:
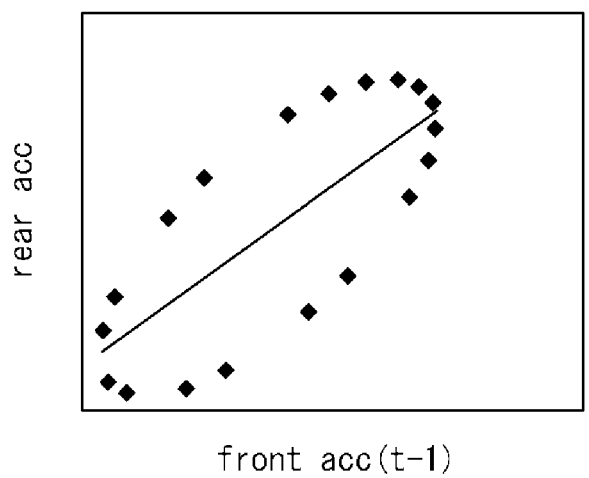
FIG. 10A is a chart showing a correlation of wheel acceleration of a front wheel and wheel acceleration of a rear wheel.
Figure 10B:
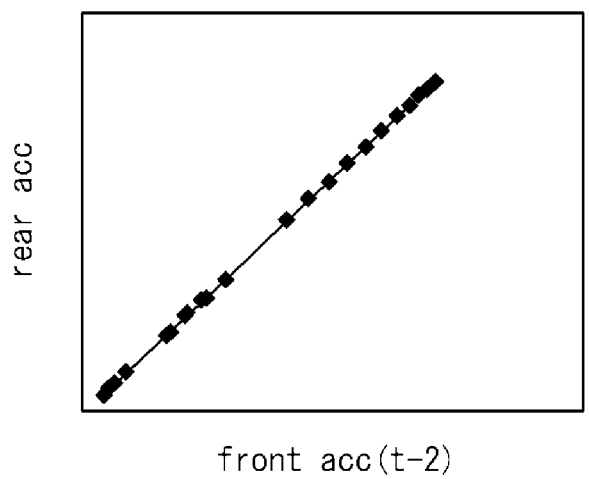
FIG. 10B is a chart showing a correlation of wheel acceleration of a front wheel and wheel acceleration of a rear wheel.

FIGS. 9A to 9C show one example of the time series change in the wheel acceleration of the front tire and the rear tire in a case of traveling on the road surface which is periodically undulated along the forward direction. FIG. 9A is the same chart as FIG. 7, and the wheel acceleration of the front tire and the rear tire at the same time is plotted. In this case, as shown in FIG. 8, even on the road surface which is periodically undulated along the forward direction, there is no correlation of the wheel acceleration of the front and rear wheels. Meanwhile, in FIG. 9B, the wheel acceleration of the front tire of one cycle before the rear tire is plotted, and in FIG. 9C, the wheel acceleration of the front tire of two cycles before the rear tire is plotted. In this case, when the wheel acceleration of one cycle before is plotted, there is no remarkable correlation between the wheel acceleration of the front wheel and the wheel acceleration of the rear wheel as shown in FIG. 10A. However, when the wheel acceleration of two cycles before is plotted, there is a clear correlation between the wheel acceleration of the front wheel and the wheel acceleration of the rear wheel as shown in FIG. 10B. The horizontal axis of FIG. 10A indicates the wheel acceleration of the front tire of one cycle before the rear tire, and the horizontal axis of FIG. 10B indicates the wheel acceleration of the front tire of two cycles before the rear tire.

As described above, in a case of the above description, it is found that the vehicle is traveling on the road surface which is periodically undulated along the forward direction of the vehicle and there is a possibility that the periodic noise possibly influencing the estimate of the torsional resonance frequency is generated.

When the periodic noise from the road surface becomes the frequency close to the torsional resonance frequency, estimate precision of the torsional resonance frequency is deteriorated problematically. Specifically, when an input frequency generated from the road surface is 30 to 50 Hz, the estimate precision is deteriorated. One cycle of 30 to 50 Hz is 20 to 40 msec. In a case where the sampling cycle of the wheel speed is 4 msec, 5 to 10 data are sampled in one cycle. Thus, it is thought that by shifting one or two data of the front tire, there is a correlation between the wheel acceleration of the front wheel and the wheel acceleration of the rear wheel.

Values of the wheel acceleration of the front tire up to two cycles before are stored, and correlations between the "current" vehicle acceleration of the rear tire, and the "current", "one-cycle-before", and "two-cycle-before" vehicle acceleration of the front tire are respectively determined. When any of the correlations becomes high, judging that the unevenness or the undulation of the road surface is periodic and the estimate of the torsional resonance frequency is harmfully influenced, the estimate of the torsional resonance frequency by the AR model is stopped.

EXAMPLE

Next, an example of the detection method of the present invention will be described. The present invention is not limited only to this example.

Example 1

The detection method of the present invention was applied to front wheels of a FF vehicle. Wheel speed was sampled by a sampling cycle of 4 ms, and a torsional resonance frequency of wheel acceleration calculated based on data applied to the band-pass filter of 30 to 50 Hz was time-series estimated by the secondary AR model. A correlation (contribution) of a wheel acceleration difference between the left and right front wheels and a wheel acceleration difference between the left and right rear wheels was calculated. Regarding the contribution, 250 data (for 1 second) were calculated for each of the left and right wheels, and the data in a case where the contribution is more than 0.1 were rejected.

Comparative Example 1

As well as Example 1, wheel speed was sampled and a torsional resonance frequency of wheel acceleration calculated based on the obtained wheel speed was time-series estimated. Unlike Example 1, a contribution was not calculated, and therefore, rejection of data by the contribution was not performed.

As described above, the road surface inputs to the front and rear wheels at the same time are usually independent from each other. Thus, normally, there is no correlation between left and right wheel acceleration. However, in a case where the vehicle travels on the road surface which is periodically changed, there is sometimes a case where a vibration component with the correlation between the front and rear wheels appears in the wheel acceleration. When this vibration component appears in the frequency close to the original torsional resonance frequency, the time-series estimated value of the torsional resonance frequency is pulled by the vibration component, and the original torsional resonance frequency cannot be estimated.

Figure 11:
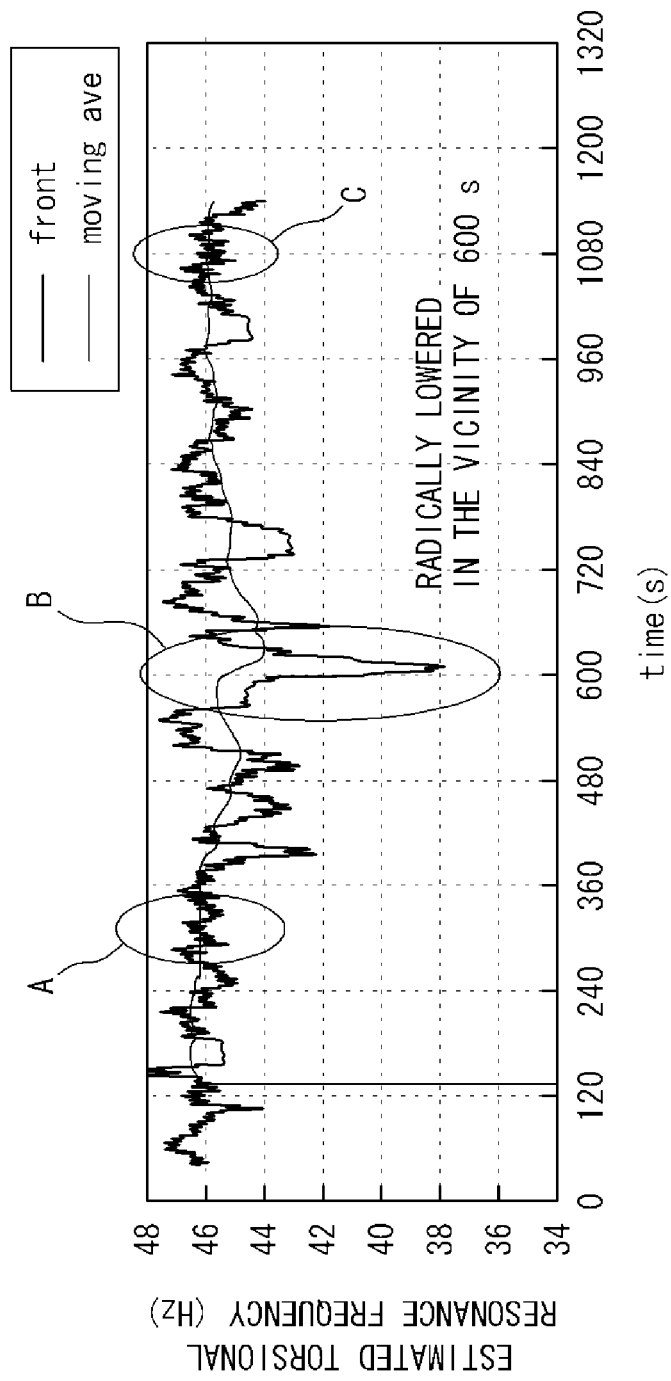
FIG. 11 is a chart showing a time series change in an estimated torsional resonance frequency in Example 1.

FIG. 11 shows a time series change in the estimated torsional resonance frequency in Example 1. As shown in the figure, when periodic (at about 70 cm intervals) undulation appears on the road surface in the vicinity of 600 s after starting travel and the vehicle travels in this part at speed of about 90 km/h, the inputs become periodic inputs for every 0.028 s=0.7 m÷25 m/s. Since this corresponds to 1/0.028=35 Hz, a peak emerges in the vicinity of this frequency.

Figure 12A:
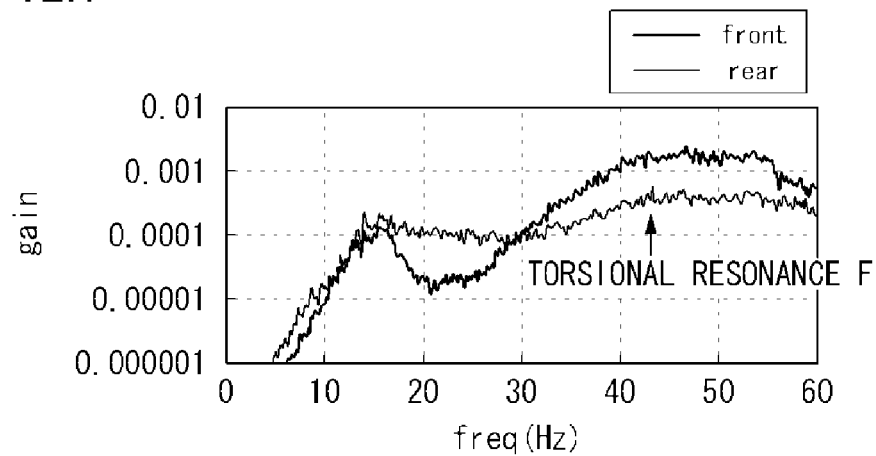
FIG. 12A is a chart showing wheel acceleration spectrum of the front wheel and the rear wheel in the vicinity of part A in FIG. 11.
Figure 12B:
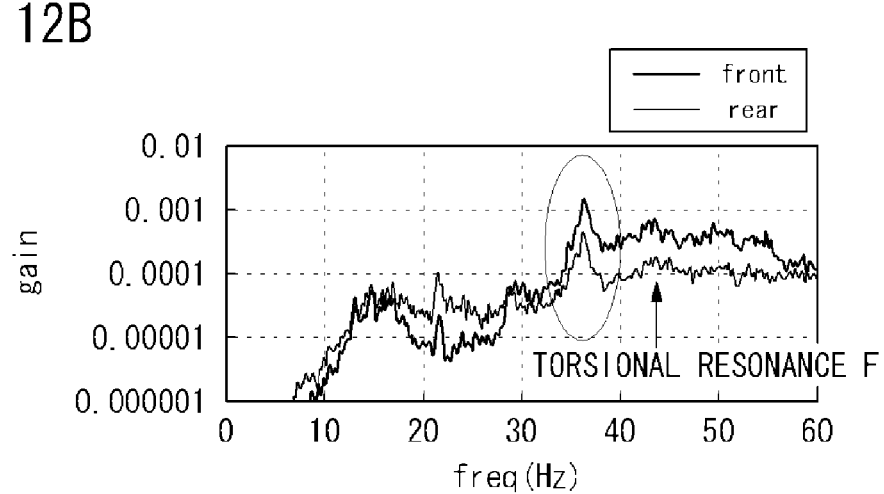
FIG. 12B is a chart showing wheel acceleration spectrum of the front wheel and the rear wheel in the vicinity of part B in FIG. 11.
Figure 12C:
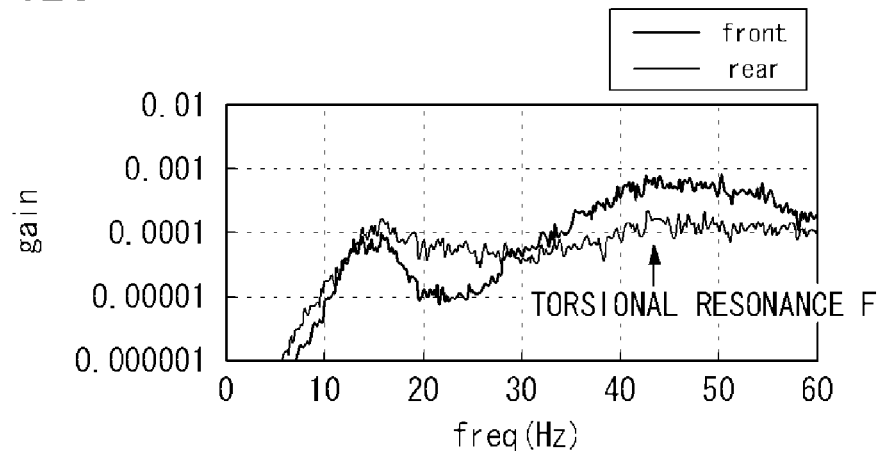
FIG. 12C is a chart showing wheel acceleration spectrum of the front wheel and the rear wheel in the vicinity of part C in FIG. 11.
Figure 13:
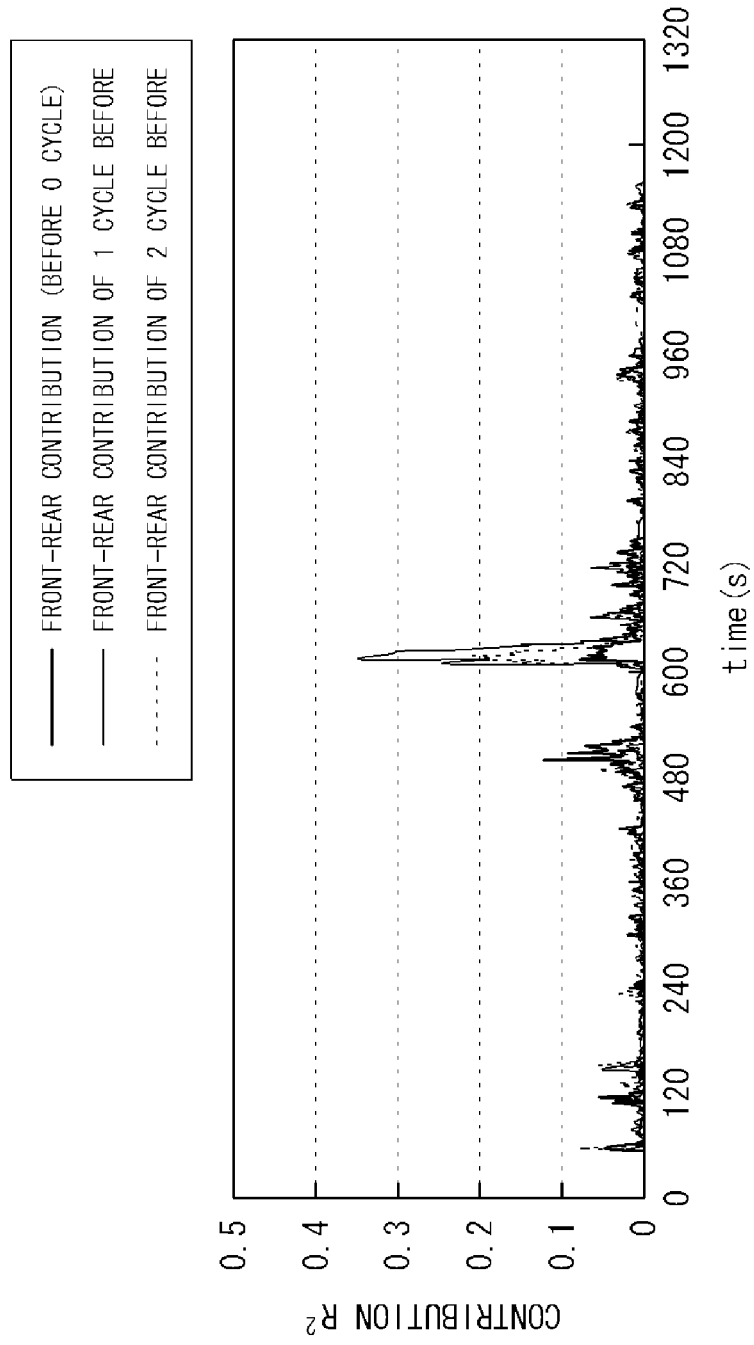
FIG. 13 is a chart showing a time series change in a correlation (contribution) of the wheel acceleration of the front wheel and the wheel acceleration of the rear wheel.

FIGS. 12A to 12C are charts respectively showing wheel acceleration spectrum of the front wheel and the rear wheel in the vicinity of parts A to C in FIG. 11. FIG. 13 is a chart showing a time series change in a correlation (contribution) of the wheel acceleration of the front wheel and the wheel acceleration of the rear wheel. In time periods shown in FIGS. 12A and 12C, the peak does not emerge in the vicinity of the torsional resonance frequency. However, the peak (refer to the inside of an elongated circle) emerges in the vicinity of the torsional resonance frequency in the vicinity of 600 s after starting travel as shown in FIG. 12B. It is found that this peak is due to the periodic undulation of the road surface appearing in the vicinity of 600 s after starting travel from the time series change in the contribution shown in FIG. 13.

Figure 14:
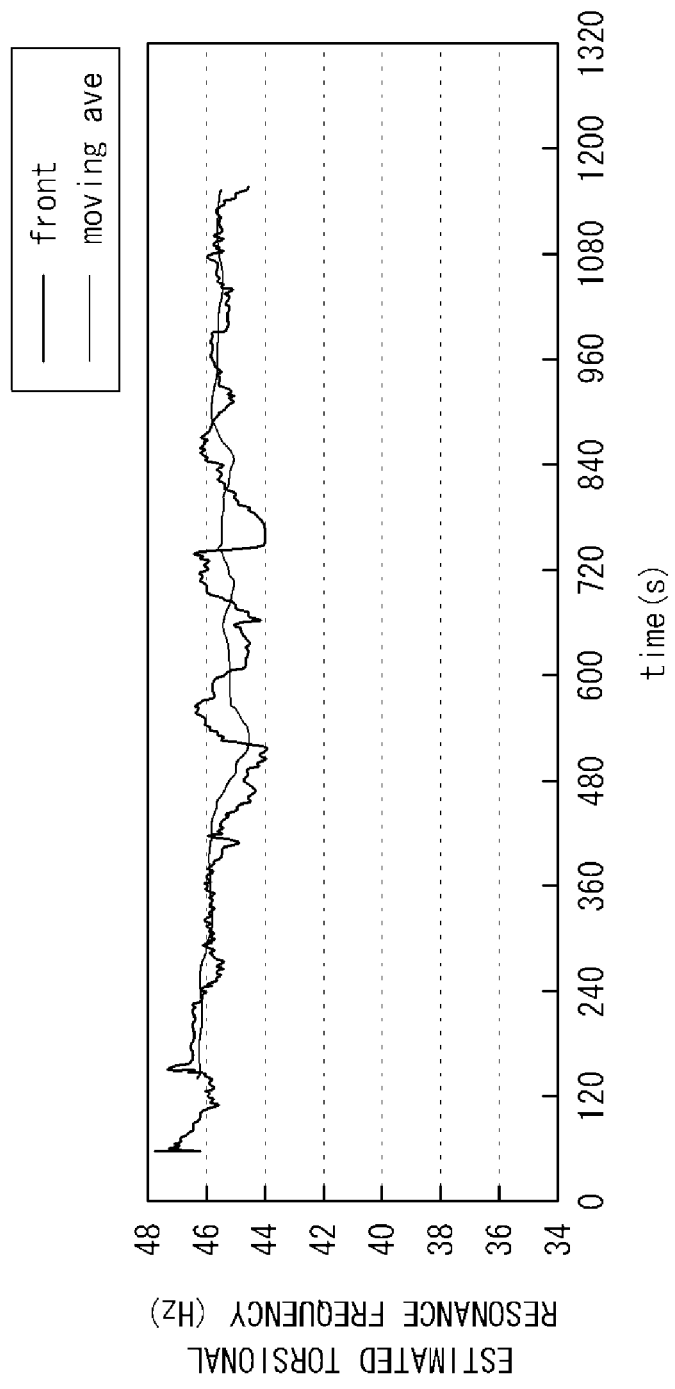
FIG. 14 is a chart showing a time series change in an estimated torsional resonance frequency of the front wheel in Example 1.

The torsional resonance frequency of the tires of the vehicle used in Example 1 and Comparative Example 1 is in the vicinity of 45 Hz. In a case of Example 1, when the contribution $R^2$ became more than 0.1, the estimate of the torsional resonance frequency was stopped. Thus, an influence by the periodic road surface can be reduced and an erroneous alarm was not caused. FIG. 14 shows a time series change in the estimated torsional resonance frequency of the front wheel. It is found that no large change appears in the vicinity of 600 s after starting travel.

Meanwhile, in a case of Comparative Example 1, the contribution was not calculated and therefore the rejection of the data by the contribution was not performed. Thus, at the time of passing through the periodic road surface, by being pulled by the vibration component from the road surface, the estimated torsional resonance frequency was lowered and it was judged that the tires were under-inflated. As a result, the erroneous alarm was issued.

Other Modification

It should be noted that the embodiment disclosed herein is thought to be not restriction but only an example in all aspects. The scope of the present invention is indicated not by the meaning described above but by the claims, and is intended to include equivalent meanings to the claims and all modifications within the scope.

For example, in the above embodiment, the torsional resonance frequency of the rotation acceleration information of the tires is time-series estimated. However, a torsional resonance frequency of rotation speed information of the tires can be time-series estimated and the decrease in the pressure of the tires can be judged based on the estimated torsional resonance frequency. Even in this case, regarding the front and rear wheels, a time series correlation of the rotation acceleration information of the front and rear wheels is calculated by the correlation calculation means. In a case where the correlation calculated by the correlation calculation means exceeds a predetermined threshold value, taking that the periodic noise from the road surface is generated in the vicinity of the torsional resonance frequency, the estimate of the torsional resonance frequency is stopped.

REFERENCE SIGNS LIST

1: WHEEL SPEED DETECTION MEANS
2: CONTROL UNIT
2a: INTERFACE
2b: CPU
2c: ROM
2d: RAM
3: DISPLAY
4: INITIALIZATION BUTTON
5: ALARM

What is claimed is:

1. A tire pressure decrease detection apparatus comprising: a rotation speed information detection mechanism configured to regularly detect rotation speed information of tires of wheels of a vehicle, a rotation acceleration information calculation mechanism configured to calculate rotation acceleration information of the tires from the rotation speed information obtained by the rotation speed information detection mechanism, a resonance frequency estimate mechanism configured to time-series estimate a torsional resonance frequency of the rotation acceleration information from the rotation acceleration information obtained by the rotation acceleration information detection mechanism, a correlation calculation mechanism configured to, regarding front and rear right wheels and front and rear left wheels, respectively calculate time series correlations of the rotation acceleration information calculated by the rotation acceleration information calculation mechanism, and a judgment mechanism configured to judge a decrease in pressure of the tires based on the estimated torsional resonance frequency, wherein in a case where the correlations calculated by the correlation calculation mechanism exceed predetermined threshold values, the resonance frequency estimate mechanism is configured to determine that a periodic noise from a road surface is generated in the vicinity of the torsional resonance frequency and stops estimating the torsional resonance frequency of the front and rear wheels of the side exceeding the threshold value.

2. The tire pressure decrease detection apparatus according to claim 1, further comprising a band-pass filter configured to let only a frequency bandwidth in the vicinity of the torsional resonance frequency pass, and wherein the correlation calculation mechanism configured to calculate a time series correlation of the rotation acceleration information passing through the band-pass filter.

3. A tire pressure decrease detection method including:
a rotation speed information detection step for regularly detecting rotation speed information of tires of wheels of a vehicle,
a rotation acceleration information calculation step for calculating rotation acceleration information of the tires from the rotation speed information obtained in the rotation speed information detection step,
a resonance frequency estimate step for time-series estimating a torsional resonance frequency of the rotation acceleration information from the rotation acceleration information obtained in the rotation acceleration information calculation step,
a correlation calculation step for, regarding front and rear right wheels and front and rear left wheels, respectively calculating time series correlations of the rotation acceleration information calculated in the rotation acceleration information calculation step, and
a judgment step for judging a decrease in pressure of the tires based on the estimated torsional resonance frequency,
wherein in a case where the correlations calculated in the correlation calculation step exceed predetermined threshold values, the resonance frequency estimate step takes that a periodic noise from a road surface is generated in the vicinity of the torsional resonance frequency and stops estimating the torsional resonance frequency of the front and rear wheels of the side exceeding the threshold value.

4. The tire pressure decrease detection method according to claim 3, wherein the correlation calculation step calculates a time series correlation of the rotation acceleration information passing through a band-pass filter for letting only a frequency bandwidth in the vicinity of the torsional resonance frequency pass.

5. A non-transitory computer readable medium encoded with a program containing instructions stored wherein which causes a computer, for detecting a decrease in pressure of tires based on a resonance frequency of the tires of a traveling vehicle, to function as: a rotation acceleration information calculation mechanism configured to calculate rotation acceleration information of the tires from rotation speed information obtained by rotation speed information detection mechanism configured to regularly detect the rotation speed information of the tires of wheels of the vehicle; a resonance frequency estimate mechanism configured to time-series estimate a torsional resonance frequency of the rotation acceleration information from the rotation acceleration information obtained by the rotation acceleration information detection mechanism; a correlation calculation mechanism configured to, regarding front and rear right wheels and front and rear left wheels, respectively calculate time series correlations of the rotation acceleration information calculated by the rotation acceleration information calculation mechanism; and a judgment mechanism configured to judge a decrease in pressure of the tires based on the estimated torsional resonance frequency, wherein in a case where the correlations calculated by the correlation calculation mechanism exceed predetermined threshold values, the resonance frequency estimate mechanism is configured to determine that a periodic noise from a road surface is generated in the vicinity of the torsional resonance frequency and stops estimating the torsional resonance frequency of the front and rear wheels of the side exceeding the threshold value.

* * * * *